M. E. BAKER.
TRACTOR.
APPLICATION FILED APR. 3, 1917.
1,266,904.
Patented May 21, 1918.
3 SHEETS—SHEET 1.
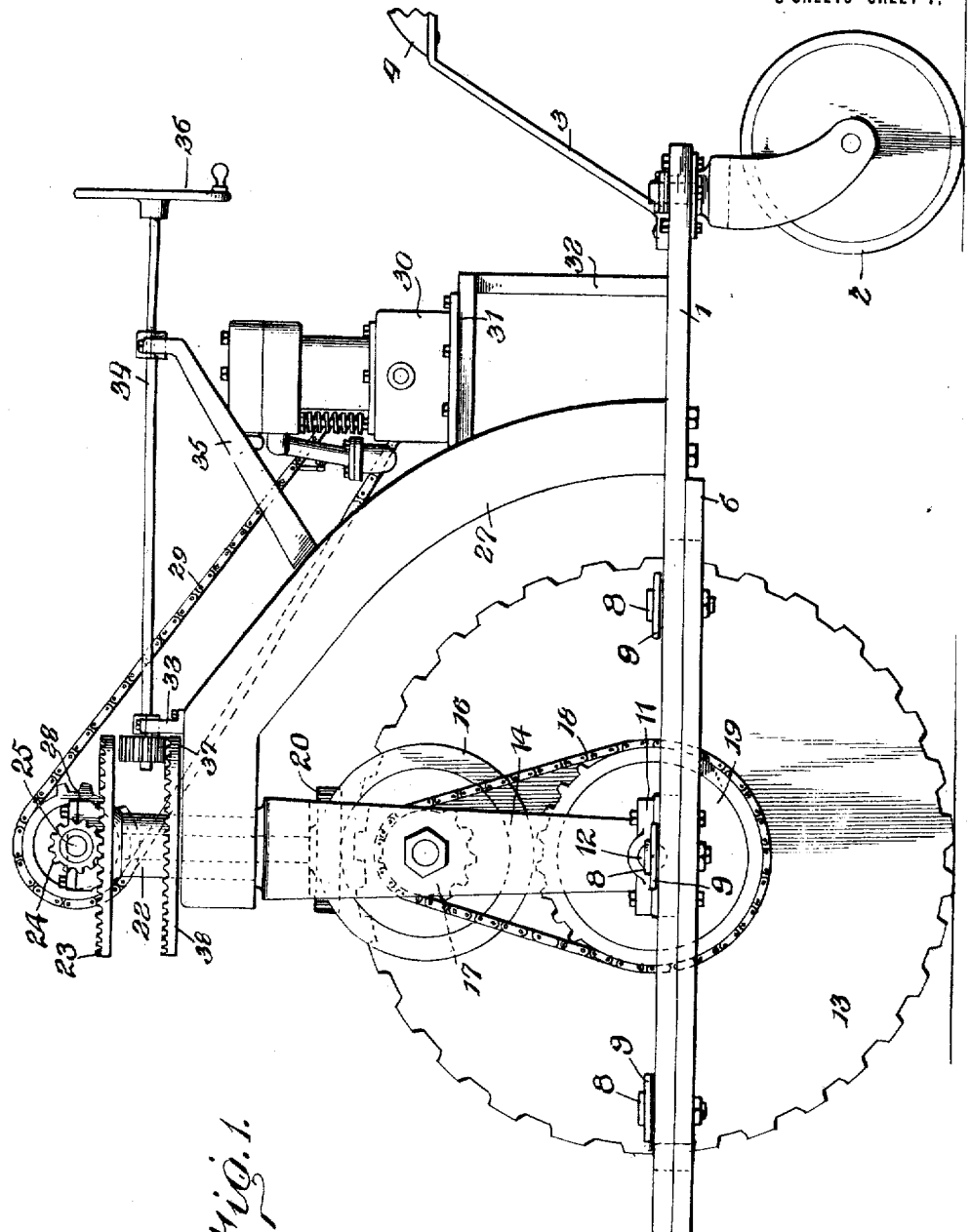
Inventor
Melyn E. Baker.
By
[signature], Attorneys.

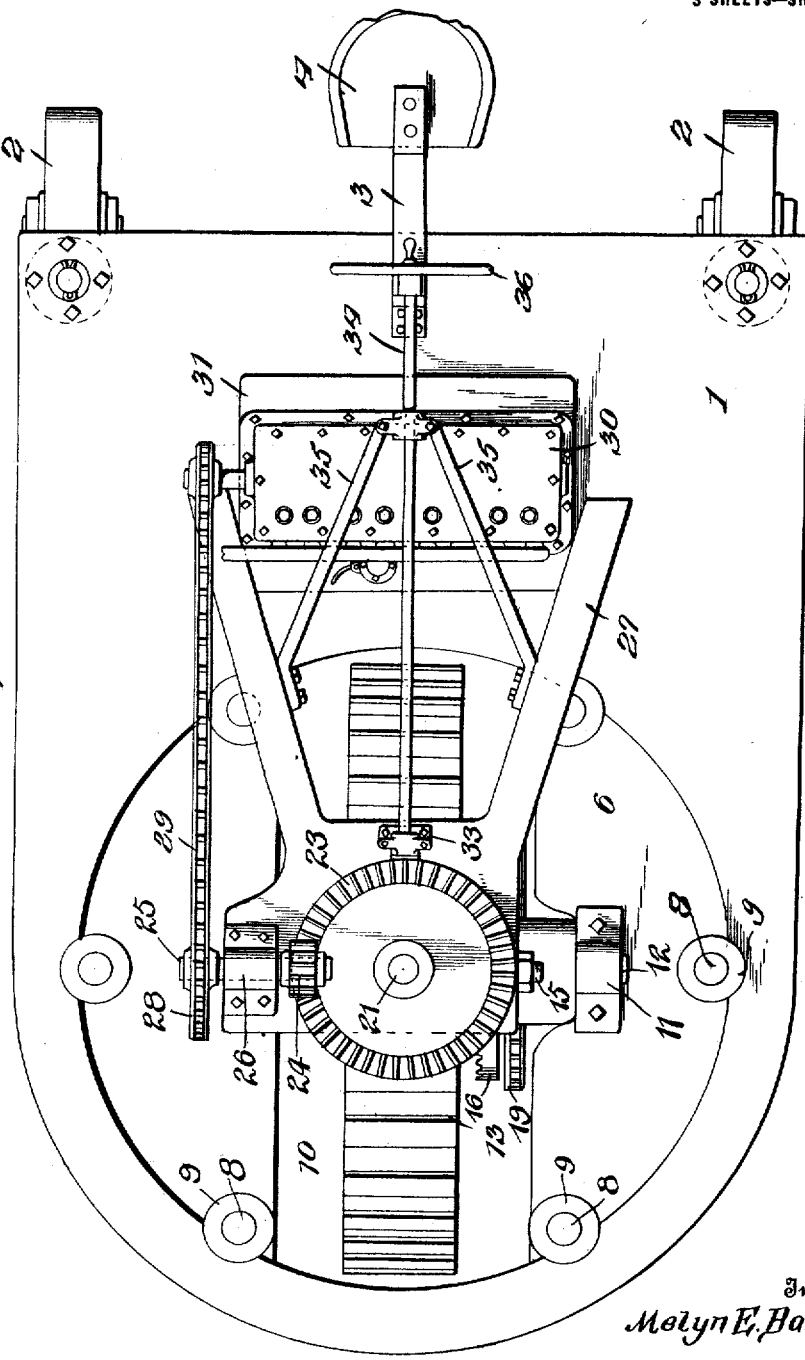

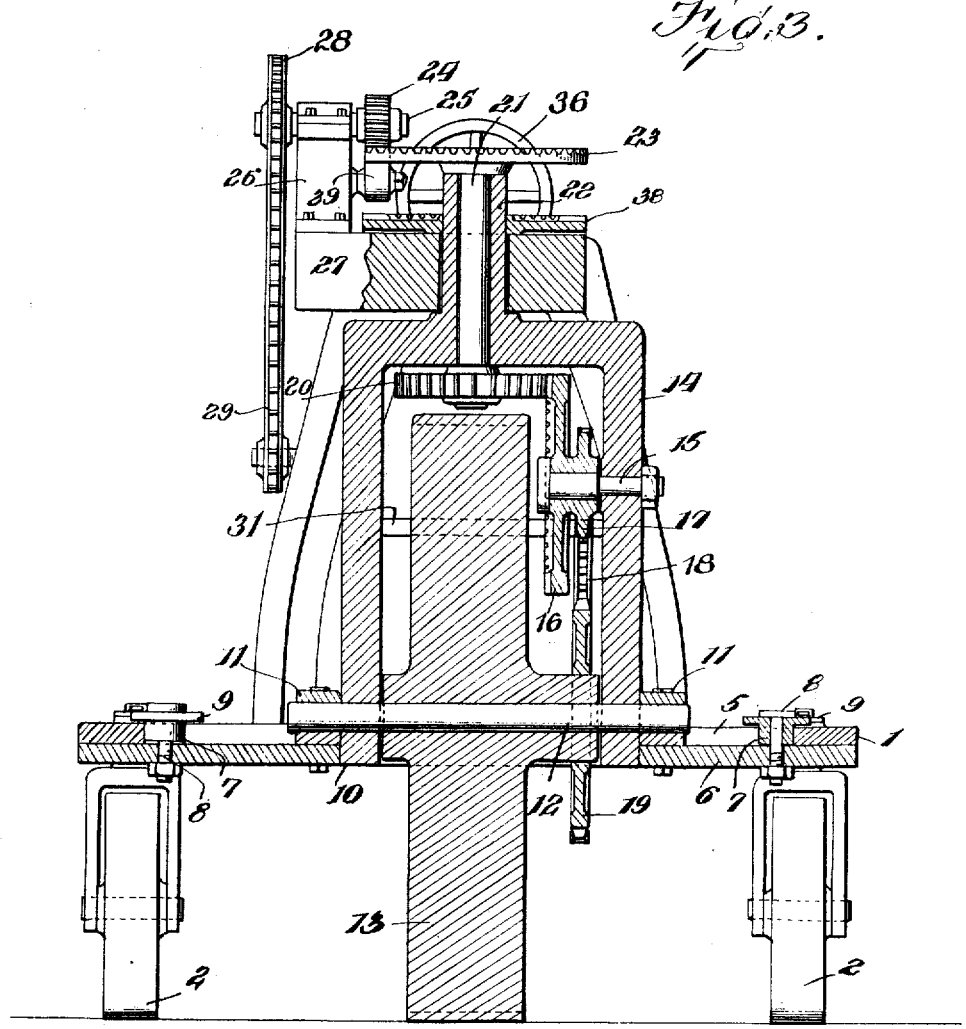

UNITED STATES PATENT OFFICE.

MELYN E. BAKER, OF ROBERT, NEBRASKA.

TRACTOR.

1,266,904.  Specification of Letters Patent.  Patented May 21, 1918.

Application filed April 3, 1917. Serial No. 159,517.

*To all whom it may concern:*

Be it known that I, MELYN E. BAKER, a citizen of the United States, residing at Robert, in the county of Hays and State of Nebraska, have invented certain new and useful Improvements in Tractors, of which the following is a specification.

This invention relates to tractors and has for its object the provision of an easily controlled machine by the use of which farm implements or vehicles may be readily drawn over a field or along a road. The invention seeks to provide an apparatus for the stated purpose which will be composed of few parts and will be compactly arranged so as to occupy but little space and permit ready access to any part needing attention.

The invention is illustrated in the accompanying drawings, in which:

Figure 1 is a side elevation of a tractor embodying my improvements;

Fig. 2 is a plan view of the same;

Fig. 3 is a vertical transverse section thereof.

In carrying out my invention, I employ a platform 1 which is supported at its rear end by caster wheels 2 which may turn freely from side to side so that the machine may readily steer. Upon the platform, at the rear of the same, is secured a standard 3 upon which is mounted a seat 4 for the driver but it is to be understood that this standard should be so disposed as to permit the attachment of a coupling head to the platform in order to permit the tractor to be connected with a vehicle or agricultural implement. It is also to be noted that the caster wheels 2 and their supporting yokes may be removed and the rear end of the platform 1 bolted directly upon the front axle of a wagon or other vehicle and the tractor thereby coupled close to the vehicle, the said axle turning in its usual manner so as to facilitate the steering of the tractor and the vehicle and enable them to make a very short turn. The platform is constructed with a central opening, as indicated at 5, and a turn table 6 is disposed below the platform and extends across the said opening, as shown clearly in Figs. 2 and 3. The turn table is equipped with a plurality of rollers 7 mounted upon spindles 8 extending through the turn table and provided with lateral flanges 9 at their upper ends which overlap the edge of the opening 5 and thereby hold the turn table properly centered relative to the platform. The turn table 6 is constructed with a slot 10 which normally extends longitudinally of the machine and upon the upper side of the turn table at the sides of said slot are bearings 11 in which is journaled the front axle 12 carrying the driving and steering wheel 13. An arched standard 14 rises from the turn table at the sides of the said slot and in one side of said standard is secured a stub shaft 15 upon which are mounted the gear wheel 16 and the sprocket wheel 17 which are preferably formed integral but may be otherwise constructed so as to necessarily move together. The sprocket wheel 17 is connected by a chain 18 with a sprocket wheel 19 fixed upon one side of the traction and steering wheel 13 whereby said wheel may be rotated in the operation of the machine. The gear wheel 16 meshes with a gear wheel 20 secured upon the lower end of a shaft 21 which is journaled in and rises through the upper end of the arched standard 14 and a sleeve 22 formed on said standard, a gear wheel 23 being secured upon the upper end of the shaft 21 and meshing with a pinion 24 on the inner end of a shaft 25 which is journaled in a bearing 26 provided upon the upper end of an arched frame 27 secured upon the platform and rising therefrom in rear of the steering wheel and extending over the same, as clearly shown in Figs. 1 and 2. Upon the outer end of the shaft 25 is a sprocket wheel 28 which is connected by a sprocket chain 29 with the driving shaft of an engine 30 secured upon a suitable base or rest 31 which is carried by the arched frame 27 and posts 32 rising from the platform 1, as shown in Fig. 1. The engine 30 will preferably be of the internal combustion type and the particular construction of the same forms no part of my present invention.

Upon the upper end of the frame 27, in rear of the sleeve 22, I secure a bracket 33 in which is journaled the front end of a steering rod 34, the rear portion of said steering rod being supported by brace bars 35 extending upwardly and rearwardly from the frame 27 and the rear extremity of said steering rod being equipped with a steering wheel 36 which may be easily manipulated from the seat 4. The front end of the steering rod is provided with a pinion 37 which meshes with a rack 38 which is secured to the sleeve 22 above the upper end of the frame 27 and will preferably be arcuate so that it will remain in mesh with the pinion 37 at all times. This rack is secured rigidly to the sleeve 22 so that if the steering rod 34 be rocked or rotated, the rack will be moved to one side and consequently, the arched standard 14 will be rotated about the shaft 21 as a center and the turn table 6, together with the axle 12 and the intermediate gearing, turned to one side so that the machine will depart from its straight path. Inasmuch as the driving gearing and the steering gear rotate about a common center, the shifting of the turn table so as to guide the tractor to one side will not disarrange the driving mechanism or interfere with the proper operation of the same.

Motion is imparted to the tractor wheel 13 in an obvious manner from the engine 30 through the described train of gearing so that the wheel will be positively driven and it will be readily noted that while the parts are few in number and are simply arranged, the members of the train of gearing are so disposed that the tractor wheel will not impinge against any member of the driving gearing even in its extreme angular position. The gear wheel 23 and the rack 38 should be spaced apart sufficiently to permit free rotation of the pinion 37 and to aid in supporting the gear wheel 23 out of contact with the pinion 37 and in mesh with the pinion 24, I provide a roller 39 upon the side of the bearing 26 to engage against the under side of the said gear 23 under the pinion 24, as clearly shown in Fig. 3.

The operation and advantages of my improved tractor will be readily understood from the foregoing description, taken in connection with the accompanying drawings. It is to be understood a friction or other type of gearing may be substituted for the chain and sprocket gearing and other changes may be made without departing from the invention as the same is defined in the following claim.

Having thus described the invention, what is claimed as new is:

In a tractor the combination of a platform, a frame rising from said platform, a turn table, an arch rising from the turn table and provided at its upper end with a sleeve extending through and rotatably fitting through the upper end of said frame, a shaft journaled in said sleeve and extending through both ends thereof, a traction wheel carried by and within the arch, gearing connecting said shaft with the traction wheel, a gear wheel on the upper end of said shaft, a bearing on the upper end of said frame at one side thereof, a shaft mounted in said bearing, means acting on the outer end of said shaft to rotate the same, a pinion on the inner end of said shaft meshing with the upper side of said gear wheel, a rack on said sleeve below said wheel, a pinion meshing with said rack, means for rotating said pinion, and a roller mounted on the frame and bearing against the under side of said gear wheel in the vertical plane of the pinion meshing with the upper side thereof to support said gear wheel out of contact with the pinion below it.

In testimony whereof I affix my signature.

MELYN E. BAKER. [L. S.]

Copies of this patent may be obtained for five cents each, by addressing the "Commissioner of Patents, Washington, D. C."